United States Patent
Kiriyama et al.

(10) Patent No.: US 7,250,881 B2
(45) Date of Patent: Jul. 31, 2007

(54) ENCODER OUTPUT SIGNAL CORRECTION APPARATUS AND METHOD

(75) Inventors: Tetsuro Kiriyama, Kawasaki (JP); Ryuichi Koiso, Kawasaki (JP); Toshirou Yoshinaka, Kawasaki (JP)

(73) Assignee: Mitutoyo Corporation, Kawasaki-shi (JP)

( * ) Notice: Subject to any disclaimer, the term of this patent is extended or adjusted under 35 U.S.C. 154(b) by 147 days.

(21) Appl. No.: 11/248,365

(22) Filed: Oct. 12, 2005

(65) Prior Publication Data
US 2006/0076480 A1 Apr. 13, 2006

(30) Foreign Application Priority Data
Oct. 13, 2004 (JP) .............................. 2004-299001

(51) Int. Cl.
*H03M 1/48* (2006.01)
(52) U.S. Cl. ...................................... 341/115; 341/155
(58) Field of Classification Search ................ 341/115, 341/111, 118, 120, 119, 155; 250/231.13, 250/231.14; 33/706; 363/41; 327/187
See application file for complete search history.

(56) References Cited

U.S. PATENT DOCUMENTS

| | | | |
|---|---|---|---|
| 5,475,581 A * | 12/1995 | Lansberry | 363/41 |
| 5,689,203 A * | 11/1997 | Geist | 327/187 |
| 6,029,363 A | 2/2000 | Masreliez et al. | |
| 6,487,787 B1 * | 12/2002 | Nahum et al. | 33/706 |
| 6,897,435 B2 * | 5/2005 | Remillard et al. | 250/231.13 |
| 7,075,057 B2 * | 7/2006 | Remillard et al. | 250/231.13 |
| 7,126,109 B2 * | 10/2006 | Goldman et al. | 250/231.14 |

FOREIGN PATENT DOCUMENTS

| | | |
|---|---|---|
| DE | 101 63 504 A1 | 7/2003 |
| EP | 0 412 825 A2 | 2/1991 |
| EP | 0 708 311 A2 | 4/1996 |
| JP | 03-048122 | 1/1991 |
| JP | 08-145724 | 6/1996 |
| JP | 10-311741 | 11/1998 |
| JP | 2003-222534 | 8/2003 |

OTHER PUBLICATIONS

Eom T et al: "A Simple Method for the Compensation of the Nonlinearity in the Heterodyne Interferometer" Measurement Science and Technology, IOP, Bristol, GB, vol. 13, No. 2, Feb. 2002, pp. 222-225, XP001208835 ISSN: 0957-0233.

* cited by examiner

*Primary Examiner*—Jean Bruner Jeanglaude
(74) *Attorney, Agent, or Firm*—Rankin, Hill, Porter & Clark LLP (57) ABSTRACT

An offset error, an amplitude error, a phase error and a third harmonic component contained in two-phase sinusoidal signals are removed using relatively simple digital computations. An offset error contained in two-phase sinusoidal signals with a phase difference output from an encoder is detected and corrected. Then, an amplitude error contained in the offset-corrected two-phase sinusoidal signals is detected and corrected. Subsequently, a phase error contained in the amplitude-corrected two-phase sinusoidal signals is detected and corrected. Further, a third harmonic distortion contained in the phase-corrected two-phase sinusoidal signals is detected and corrected. Each correction step includes detecting an error from an ideal Lissajous waveform contained in the corrected two-phase sinusoidal signals, and adding the detected error to an accumulatively added last value to yield a new correction coefficient, thereby dynamically updating the correction coefficient.

19 Claims, 11 Drawing Sheets

(c) Correction Values da, db (d) Correction Values ka1, kb1, kp1

(e) Correction Value a3

ENCODER OUTPUT SIGNAL CORRECTION APPARATUS AND METHOD

CROSS-REFERENCE TO RELATED APPLICATION

This application is based on and claims the benefit of priority from prior Japanese Patent Application No. 2004-299001, filed on Oct. 13, 2004, the entire contents of which are incorporated herein by reference.

BACKGROUND OF THE INVENTION

1. Field of the Invention

The present invention relates to an encoder output signal correction apparatus and method for correcting two-phase sinusoidal signals output from an encoder that detects positions, angles, velocities, angular velocities and so forth.

2. Description of the Related Art

An interval between gratings formed on a scale in an encoder is limited to process. In order to measure a finer interval than that between the scale gratings, the spatial period of a phase variation in a sinusoidal signal output from the encoder should be divided much finer and interpolated. A variety of interpolators have been employed in the art. For example, a digitized interpolator comprises an A/D converter and a memory. The A/D converter is operative to receive A-, B-phase sinusoidal signals with a phase difference of 90° output from the encoder and sample the signals at a certain frequency to convert them into digital data. The memory is employed to store a look-up table for use in searching phase angle data PH at each sampling point based on the digital data DA, DB obtained at the A/D converter, The look-up table is created based on PH=ATAN (DA/DB) using a function of arctangent (ATAN).

The A-, B-phase sinusoidal signals output from the encoder are usually not complete sinusoidal-waves and can be represented in an orthogonal coordinate system as describing an elliptical Lissajous waveform generally. When the A-, B-phase sinusoidal signals have different amplitudes in voltage, the Lissajous waveform becomes elliptical. An offset value of each signal voltage turns the Lissajous waveform into a circular or elliptical waveform deviated from the origin. The presence of a phase error brings the major and minor axes of an ellipse into a state not parallel with the coordinate axes but tilted at 45° thereto. An interpolator is made on the assumption that the A-, B-phase sinusoidal signals are sinusoidal waves. Accordingly, a deviation from an ideal sinusoidal wave exerts an ill effect on the interpolation accuracy. In order to correct amplitude errors, phase errors and offsets in the A-, B-phase sinusoidal signals, devices for the purpose have been proposed in JP-A 10-311741 and JP-A 2003-222534, for example.

In the two-phase sinusoidal signals after such the amplitude error and so fourth are corrected, however, a deviation from an ideal sinusoidal signal waveform, or a waveform distortion, is large, and the distortion factor fluctuates greatly in particular as the interval between a main scale and an index scale fluctuates. The waveform distortion is mostly caused by higher harmonic components of odd degrees (third, fifth degree, and so forth). When the two-phase sinusoidal signals with such the fluctuating distortion factor is employed in measurements, a large measurement error arises.

Several technologies have been proposed to provide sinusoidal signals from which such the higher harmonic components are removed. For example, JP-A 3-48122 proposes a technology, which provides two rectangular grating patterns with a slight phase difference on a scale and sums the outputs therefrom to just cancel higher harmonic components. JP Patent No. 2695623 proposes another technology, in which a scale with uniform gratings and a scale with non-uniform gratings are combined to provide sinusoidal signals from which such the higher harmonic components are removed.

The technology of JP-A 3-48122 reduces the waveform distortion to some extent though the accuracy is not sufficient for application to position measurements in precise machining or the like. The system of JP Patent No. 2695623 requires precise creation of a duty factor between light and dark portions while the precise creation is difficult in a fine scale.

The present invention has an object to provide an encoder output signal correction apparatus and method capable of removing a third harmonic component contained in a sinusoidal signal using relatively simple digital computations, thereby improving the interpolation accuracy in an interpolator. It is also possible to improve robustness against offset errors, amplitude errors, phase errors and higher harmonic component errors due to non-uniformity of scales and non-uniformity of alignments in an encoder.

SUMMARY OF THE INVENTION

To achieve the above object, in one aspect the present invention provides an encoder output signal correction apparatus for correcting two-phase sinusoidal signals with a phase difference output from an encoder. The apparatus comprises a detector means operative to detect an error from an ideal Lissajous waveform contained in a Lissajous waveform obtained from the two-phase sinusoidal signals; and a corrector means operative to correct the two-phase sinusoidal signals using a correction coefficient based on the error detected at the detector means. The detector means detects an error from the ideal Lissajous waveform contained in the two-phase sinusoidal signals corrected at the corrector means, and adds the detected error to an accumulatively added last value to yield a new correction coefficient, thereby dynamically updating the correction coefficient.

In one aspect the present invention provides an encoder output signal correction method, comprising: detecting and correcting an offset error contained in two-phase sinusoidal signals with a phase difference output from an encoder; detecting and correcting an amplitude error contained in the offset-corrected two-phase sinusoidal signals; detecting and correcting a phase error contained in the amplitude-corrected two-phase sinusoidal signals; and detecting and correcting a third harmonic distortion contained in the phase-corrected two-phase sinusoidal signals. Each correction step includes detecting an error from an ideal Lissajous waveform contained in the corrected two-phase sinusoidal signals, and adding the detected error to an accumulatively added last value to yield a new correction coefficient, thereby dynamically updating the correction coefficient.

The detector means herein includes at least one of an offset error, an amplitude error, a phase error and a third harmonic distortion contained in the Lissajous waveform obtained from the two-phase sinusoidal signals. In this case, the detector, may be configured to compute the maximum and the minimum of a radius of the Lissajous waveform and, based on a difference between the maximum and the minimum, compute an amplitude of the third harmonic component as the third harmonic distortion. Alternatively, the detector may be configured to detect a phase when a radius of the Lissajous waveform reaches the maximum or the minimum and, based on the detected results compute a phase of the third harmonic component as the third harmonic distortion.

The detector may also be configured to derive a variation in radius of the Lissajous waveform through a Fourier analysis to compute an amplitude and phase of the third harmonic component.

On the other hand, the correct or may be configured to rotate the Lissajous waveform obtained from the two-phase sinusoidal signals containing a third harmonic component by a phase computed at the detector such that the third harmonic component has a phase of 0° or 90°; derive a value of the third harmonic component corresponding to each value of the two-phase sinusoidal signals; subtract the value of the third harmonic component from two-phase sinusoidal signals corresponding to the rotated Lissajous waveform to correct amplitude; and inversely rotate a Lissajous waveform obtained from the corrected two-phase sinusoidal signals by the same angle as the rotated angle.

In the present invention, an error from the ideal Lissajous waveform contained in the two-phase sinusoidal signals corrected at the corrector means is detected, and the detected error is added to an accumulatively added last value to yield a new correction coefficient, thereby dynamically updating the correction coefficient. Accordingly, the computation of error parameters of the Lissajous waveform requires no complicated process and leads to possible fast convergence. Therefore, it is possible to improve the interpolation accuracy in an interpolator. It is also possible to improve robustness against higher harmonic component errors due to non-uniformity of scales and non-uniformity of alignments in an encoder.

DETAILED DESCRIPTION OF THE INVENTION

Embodiments of the present invention will now be described in detail with reference to the drawings.

Figure 1:
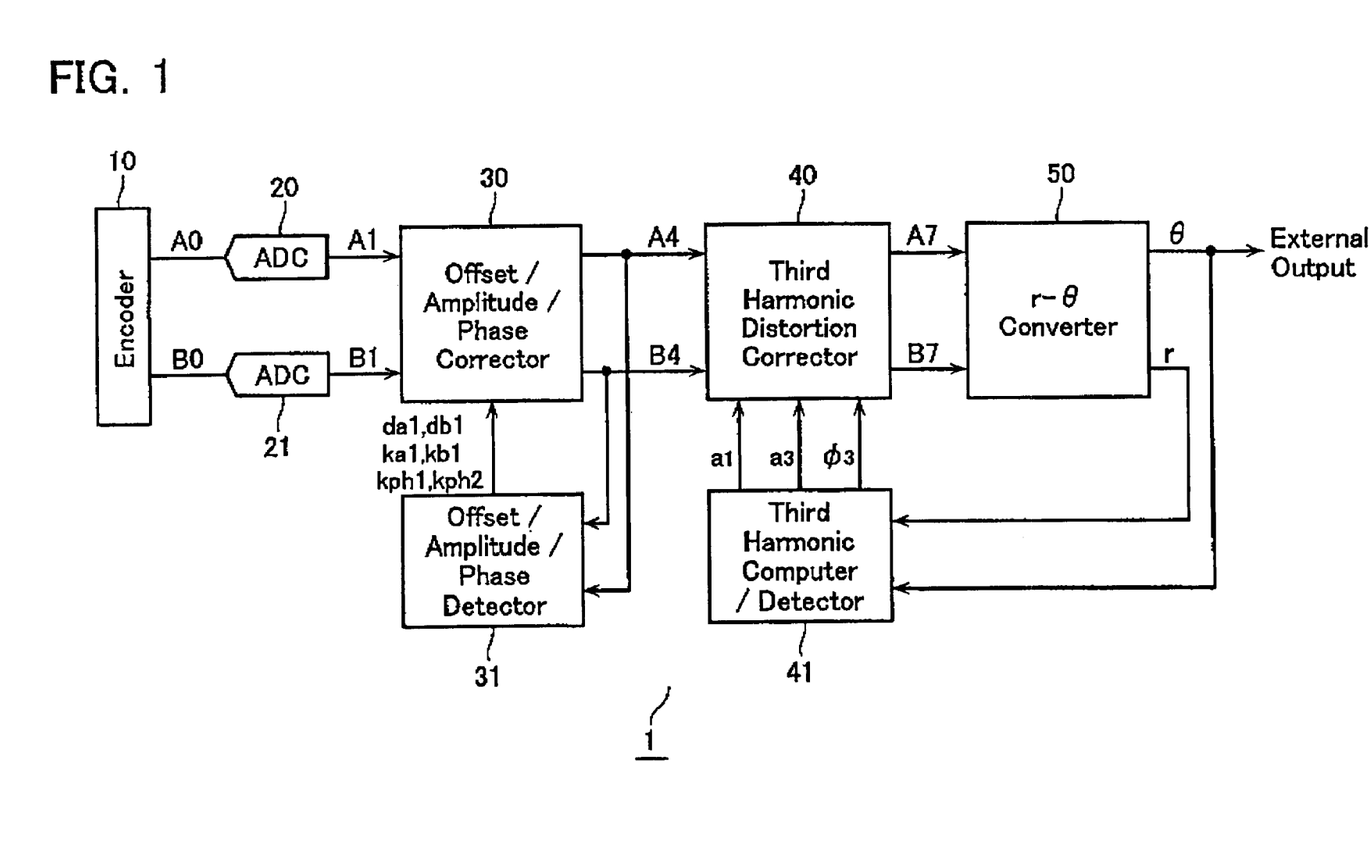
FIG. 1 is a block diagram showing a basic configuration of an encoder output signal correction device 1 according to an embodiment of the present invention.

FIG. 1 is a block diagram showing a basic configuration of an encoder output signal correction device 1 according to an embodiment of the present invention. The encoder output signal correction device 1 comprises A/D converters 20, 21, an offset/amplitude/phase corrector 30, an offset/amplitude/phase detector 31, a third harmonic distortion corrector 40, a third harmonic computer/detector 41, and an r-θ converter 50, This device is operative to correct output signals A0, B0 from the encoder 10 to remove a third harmonic distortion therefrom.

The encoder 10 may be of the photoelectric type or the magnetic type, for example, without distinction of detection principle. The A-, and B-phase sinusoidal signals A0, B0 output from the encoder 10 may usually contain an amplitude error, a phase error, an offset and a third harmonic distortion.

The signals A0, B0 are sampled by the A/D converters 20, 21 at a certain frequency and converted into digital signals A1, B1, which are fed to the offset/amplitude/phase corrector 30. Based on correction coefficients computed at the offset/amplitude/phase detector 31, the offset/amplitude/phase corrector 30 corrects offsets, amplitudes and phases of the digital signals A1, B1 and provides output signals A4, B4. Based on the outputs signals A4, B4, the offset/amplitude/phase detector 31 computes the correction coefficients for use in the offset/amplitude/phase corrector 30. A method of computing the correction coefficients will be described later.

The output signals A4, B4 are amplitude-, phase- and offset-corrected sinusoidal output signals but still contain higher harmonic components including third harmonics. Therefore, the third harmonic distortion corrector 40 corrects third harmonic components in the output signals A4, B4 and provides output signals A7, B7. This correction is executed based on correction coefficients (an amplitude $a_1$ of a fundamental harmonic, an amplitude $a_3$ of a third harmonic, and a phase $\phi_3$ of a third harmonic, which are detailed later) given from the third harmonic computer/detector 41. The r-θ converter 50 creates a Lissajous waveform from the output signals A7, B7 and computes a radius r at each phase θ of the Lissajous waveform. The third harmonic computer/detector 41 computes the correction coefficients based on r, θ.

The following description is given to the details of correction processes using the encoder output signal correction device 1 thus configured.

Figure 2:
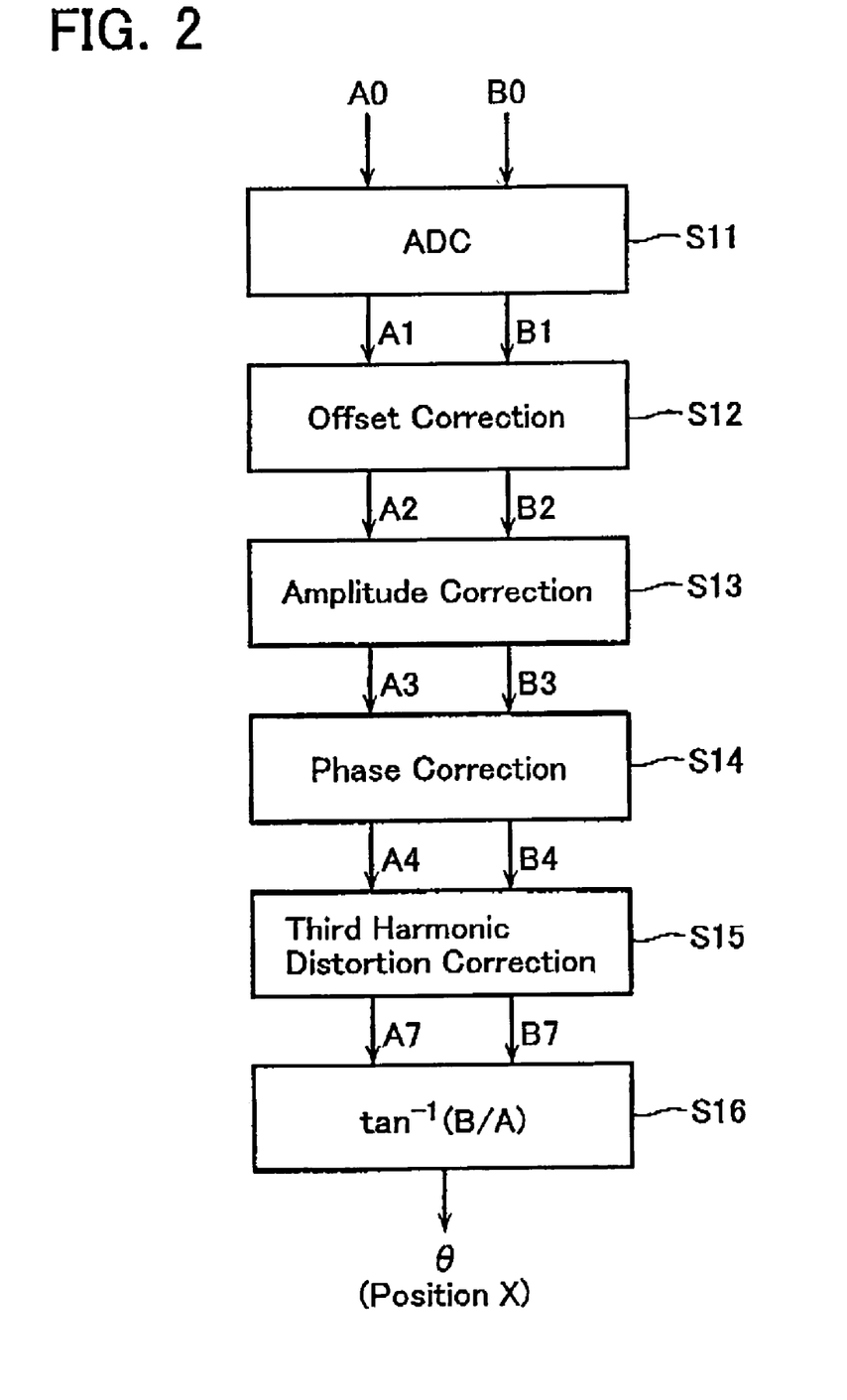
FIG. 2 is a flowchart showing a process flow in the correction device 1.

FIG. 2 is a flowchart showing the correction processes.

The A- and B-phase sinusoidal signals A0, B0, output from the encoder 10, are AD-converted (S-11) into the digital A- and B-phase sinusoidal signals A1, B1. These signals A1, B1 are represented by the following Expression 1.

$$A1 = a_0 + a_1\cos u + a_3\cos 3(u - \phi_3)$$

$$B1 = b_0 + b_1\cos\left(u - \frac{\pi}{4} - \phi_1\right) + b_3\cos 3\left(u - \frac{\pi}{4} - \phi_3\right)$$

[Expression 1]

where $a_0$, $b_0$ denote offset errors of A-phase and B-phase; $a_1$, $b_1$ denote amplitude errors of A-phase and B-phase; $\phi_1$ denotes a phase error of B-phase to A-phase; $a_3$, $b_3$ denote amplitudes of third harmonics of A-phase and B-phase; $\phi_3$ denotes a phase error of a third harmonic to a fundamental harmonic; $u=2\pi x/\lambda$, x denotes a displacement; and λ denotes a signal pitch. Of these errors, the offset errors, amplitude errors and phase errors are removed sequentially at an offset correction step (S12), an amplitude correction step (S13) and a phase correction step (S14) executed by the offset/amplitude/phase corrector 30 and the offset/amplitude/phase detector 31. Third harmonic distortions are removed at a third harmonic distortion correction step (S15) executed by the third harmonic distortion corrector 40 and the third harmonic computer/detector 41. Finally, the error-removed two-phase sinusoidal signals A7, B7 are employed at the r-θ converter 50 to provide the output signal θ.

In this embodiment, at each of the above-described correction steps (S12-S15), a recurrence formula is employed to execute a dynamic correction.

(Offset Correction)

Figure 3:
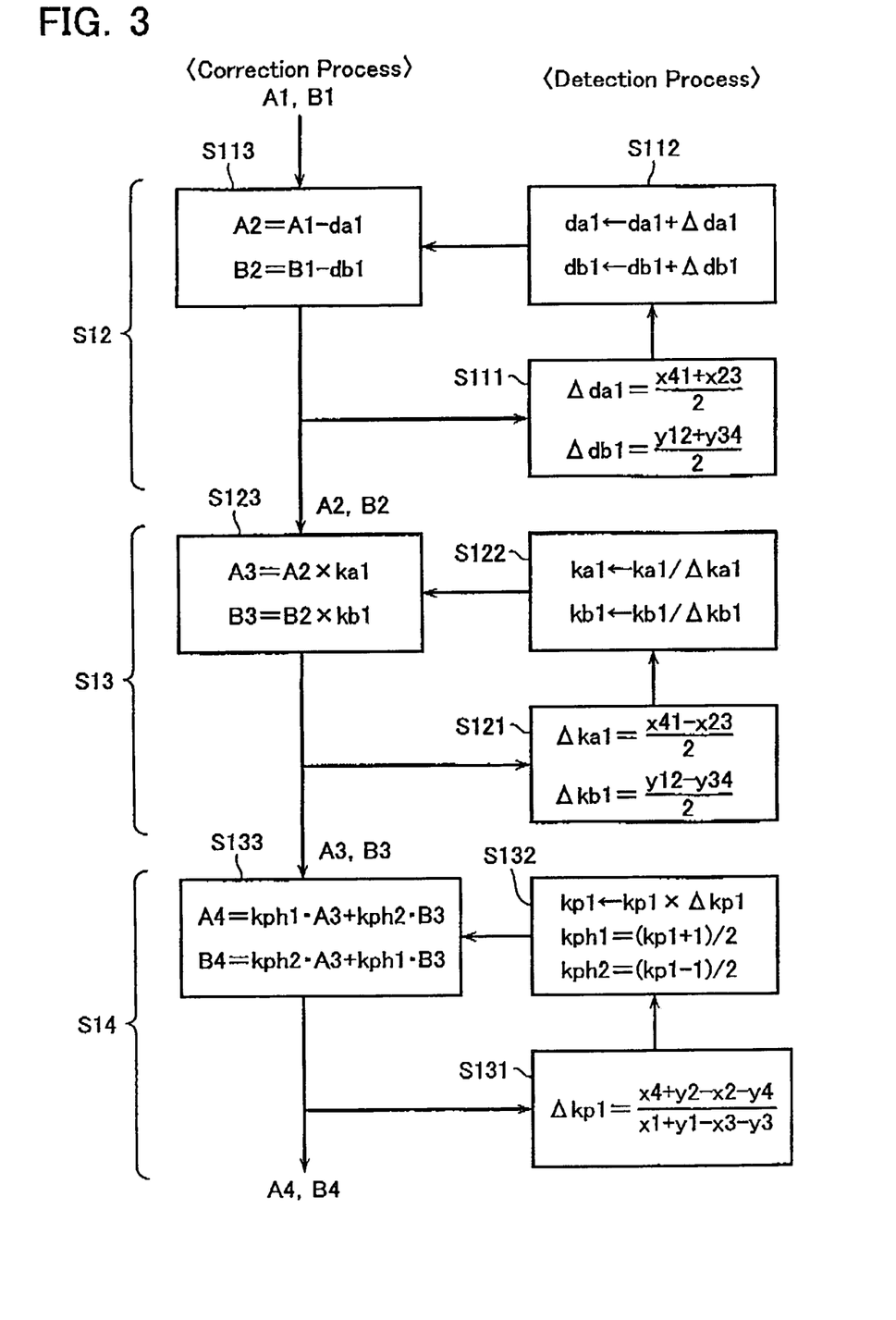
FIG. 3 is a flowchart showing details of off set correction, amplitude correction and phase correction of FIG. 2.

FIG. 3 shows details of the correction steps (S12-S14).

Figure 4:
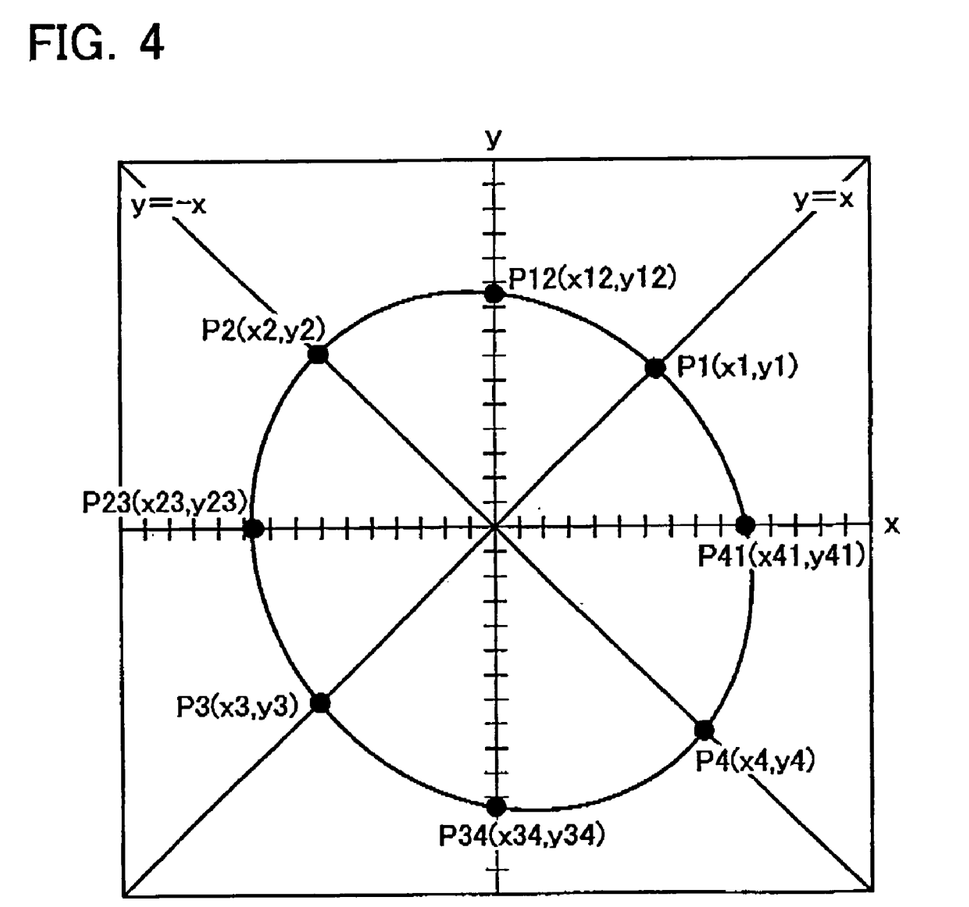
FIG. 4 shows an example of the Lissajous waveform observed.

First, from the A- and B-phase sinusoidal signals A1, B1, a Lissajous waveform of one turn is obtained as shown in FIG. 4. The Lissajous waveform has four cross-points P12, P23, P34, P41 crossing X-axis and Y-axis, from which variations $\Delta da1$, $\Delta db1$, in offset correction values in X-axis and Y-axis directions are derived as follows (S111).

$$\Delta da1 = (x41+x23)/2$$

$$\Delta db1 = (y12+y34)/2 \quad \text{[Expression 2]}$$

The $\Delta da1$, $\Delta db1$ herein derived are close to the offset errors $a_0$, $b_0$ but can not coincide therewith completely because of amplitude errors and phase errors. Therefore, feedback processes are repeated several times to gradually converge the errors. Namely, correction values da1, db1 are obtained as accumulatively added values in accordance with the following Expression 3 (S112).

$$da1 \leftarrow da1 + \Delta da1$$

$$db1 \leftarrow db1 + \Delta db1 \quad \text{[Expression 3]}$$

Then, a correction process is executed to remove offset errors from the signals A1, B1 in accordance with the following Expression 4 (S113).

$$A2 = A1 - da1$$

$$B2 = B1 - db1 \quad \text{[Expression 4]}$$

(Amplitude Correction)

In the same manner as above, from four cross-points P12, P23, P34, P41 crossing X-axis and Y-axis on the Lissajous waveform, variations $\Delta ka1$, $\Delta kb1$ in amplitude correction values in X-axis and Y-axis directions are derived as follows (S121).

$$\Delta ka1 = (x41-x23)/2$$

$$\Delta kb1 = (y12-y34)/2 \quad \text{[Expression 5]}$$

Also in this case, feedback processes are repeated several times to gradually converge the errors. Namely, correction values ka1, kb1 are obtained as accumulatively divided values in accordance with the following Expression 6 (S122).

$$ka1 \leftarrow ka1/\Delta ka1$$

$$kb1 \leftarrow kb1/\Delta kb1 \quad \text{[Expression 6]}$$

Then, a correction process is executed to remove amplitude errors from the signals A2, B2 in accordance with the following Expression 7 (S123).

$$A3 = A2 \times ka1$$

$$B3 = B2 \times kb1 \quad \text{[Expression 7]}$$

(Phase Correction)

In the same manner as above, from four cross-points P1, P2, P3, P4 crossing straight lines (y=x, y=−x) tilted at 45° to X-axis and Y-axis, a variation $\Delta kp1$ in phase correction values for A-phase and B-phase is derived as follows (S131).

$$\Delta kp1 = (x4+y2-x2-y4)/(x1+y1-x3-y3) \quad \text{[Expression 8]}$$

Also in this case, feedback processes are repeated several times to gradually converge the errors. Namely, a correction value kp1 is obtained as an accumulatively multiplied value in accordance with the following Expression 9 (S132).

$$kp1 \leftarrow kp1 \times \Delta kp1$$

$$kph1 = (kp1+1)/2$$

$$kph2 = (kp1-1)/2 \quad \text{[Expression 9]}$$

Then, a correction process is executed to remove phase errors from the signals A3, B3 in accordance with the following Expression 16 (S133).

$$A4 = kph1 \cdot A3 + kph2 \cdot B3$$

$$B4 = kph2 \cdot A3 + kph1 \cdot B3 \quad \text{[Expression 10]}$$

(Third Harmonic Distortion Correction)

The output signals A4, B4 are amplitude-, phase- and offset-corrected sinusoidal output signals but still contain higher harmonic components including third harmonics.

The third harmonics can be assumed to have the same amplitude and phase. In this case, it the fundamental harmonic has an amplitude of $a_1$ (=$b_1$), the third harmonic has an amplitude of $a_3$ (=$b_3$), and the third harmonic has a phase of $\phi_3$, then the output signals A4, B4 can be represented by the following Expression.

$$A4 = a_1 \cos u + a_3 \cos 3(u - \phi_3) \quad \text{[Expression 1]}$$

$$B_4 = a_1 \cos\left(u - \frac{\pi}{4}\right) + a_3 \cos 3\left(u - \frac{\pi}{4} - \phi_3\right)$$

Therefore, a Lissajous radius r associated with the signals A4, B4 can be computed in accordance with the following Expression.

$$r^2 = A4^2 + B4^2 \quad \text{[Expression 12]}$$

$$= a_1^2 + a_3^2 + 2a_1 a_3 \cos(4u - 3\phi_3)$$

As obvious from the above Expression, the Lissajous radius r varies at a period of λ/4 with a phase of $3\phi_3$ between the maximum $r_{max}=a_1+a_3$ and the minimum $r_{min}=a_1-a_3$. Therefore, determination of $a_1$, $a_3$ and $\phi_3$ can correct the third harmonic distortion.

(Method 1: In the Case of $\phi_3=0$)

Figure 5:
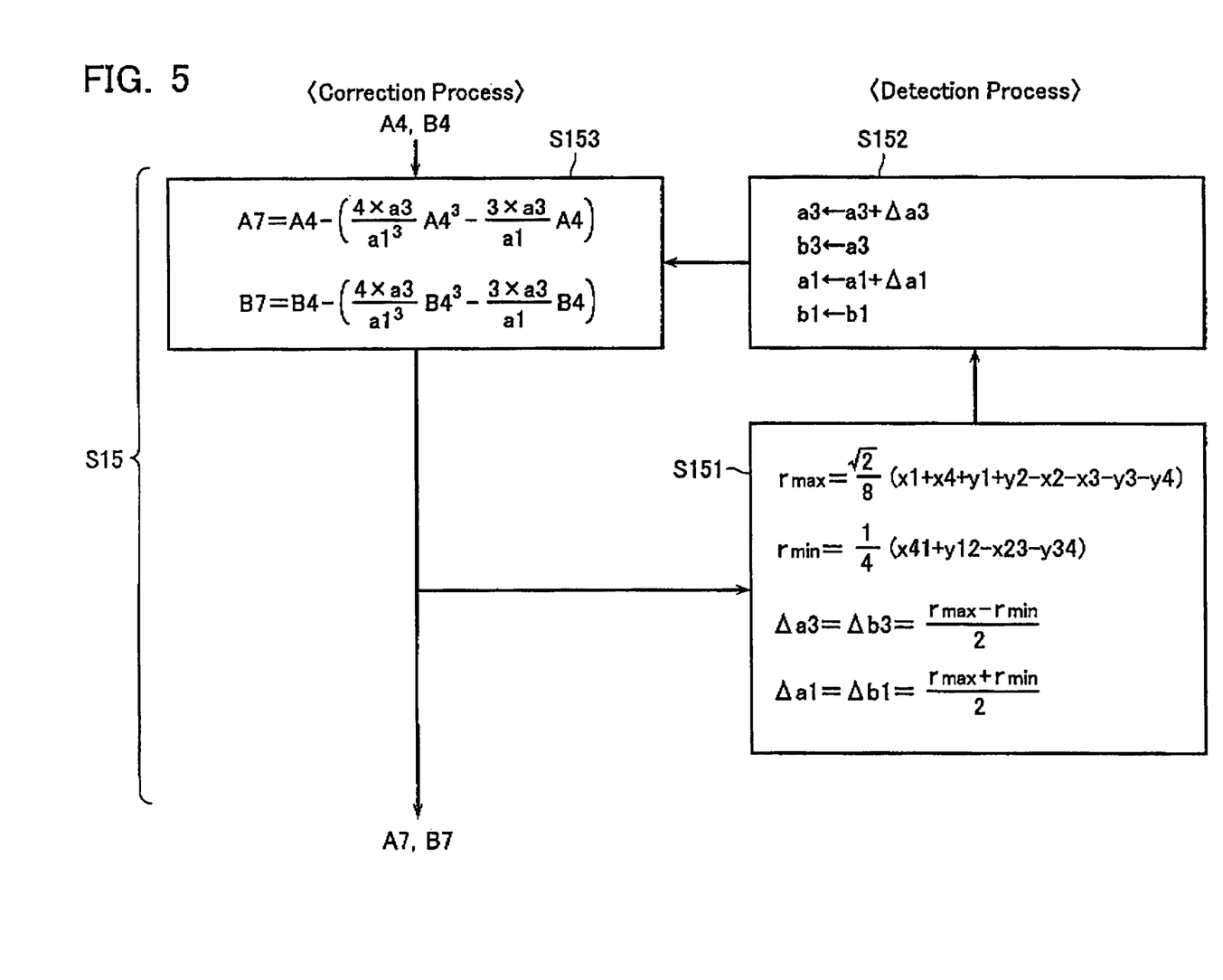
FIG. 5 is a flowchart showing details of third harmonic distortion correction of FIG. 2 (first method)
Figure 6:
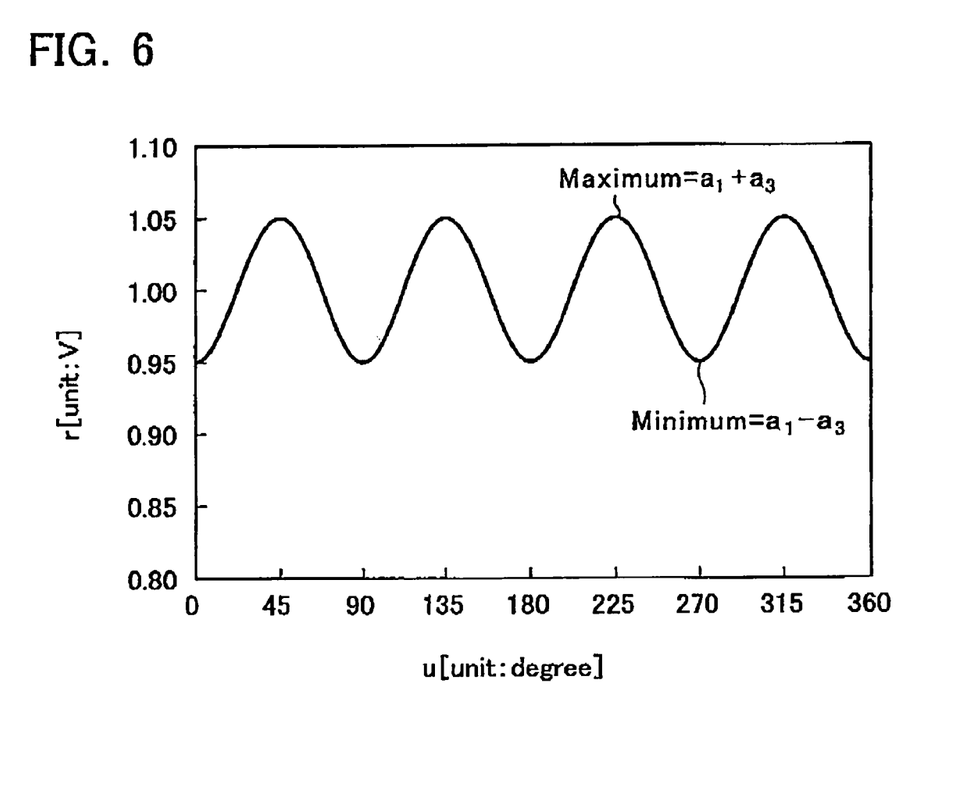
FIG. 6 illustrates a computing method of amplitudes a1, a3 in a third harmonic.

FIG. 5 shows a much simpler, first method. As described above, the radius r of the Lissajous waveform varies at a period of λ/4 due to the third harmonic distortion and has the maximum $r_{max}=a_1+a_3$ and the minimum $r_{min}=a_1-a_3$ (see FIG. 6). Therefore, $a_1$, $a_3$ can be computed using $r_{max}$, $r_{min}$ as follows.

$$\Delta a_1 = \Delta b_1 = (r_{max}+r_{min})/2$$

$$\Delta a_3 = \Delta b_3 = (r_{max}-r_{min})/2 \quad \text{[Expression 13]}$$

For the purpose of simplification, it is herein assumed that the phase is regarded as $\phi_3=0$. For example, on the assumption that the minimum $r_{min}$ of the radius exists on X, Y-axis and the maximum $r_{max}$ exists on a line tilted at 45° to X, Y-axis, the values $r_{min}$, $r_{max}$ can be obtained as follows (S151).

$$r_{max} = \frac{\sqrt{2}}{8}(x1 + x4 + y1 + y2 - x2 - x3 - y3 - y4) \quad \text{[Expression 14]}$$

$$r_{min} = \frac{1}{4}(x41 + y12 - x23 - y34)$$

Also in this case, feedback processes are repeated several times to gradually converge the errors. Namely, the correction values $a_1$, $a_3$ are obtained as accumulatively added values in accordance with the following Expression 15 (S152).

$$a1 \leftarrow a1 + \Delta a1$$

$$a3 \leftarrow a3 + \Delta a3 \quad \text{[Expression 15]}$$

Then, a correction process is executed to remove a third harmonic distortion from the signals A4, n4 in accordance with the following Expression 16 (S153).

$$A7 = A4 - \left(\frac{4a_3}{a_1^3}a4^3 - \frac{3a_3}{a_1}A4\right) \quad \text{[Expression 16]}$$

$$B7 = B4 - \left(\frac{4a_3}{a_1^3}B4^3 - \frac{3a_3}{a_1}B4\right)$$

(Method 2: In the Case of $\phi_3$ Being Arbitrary)

Figure 7:
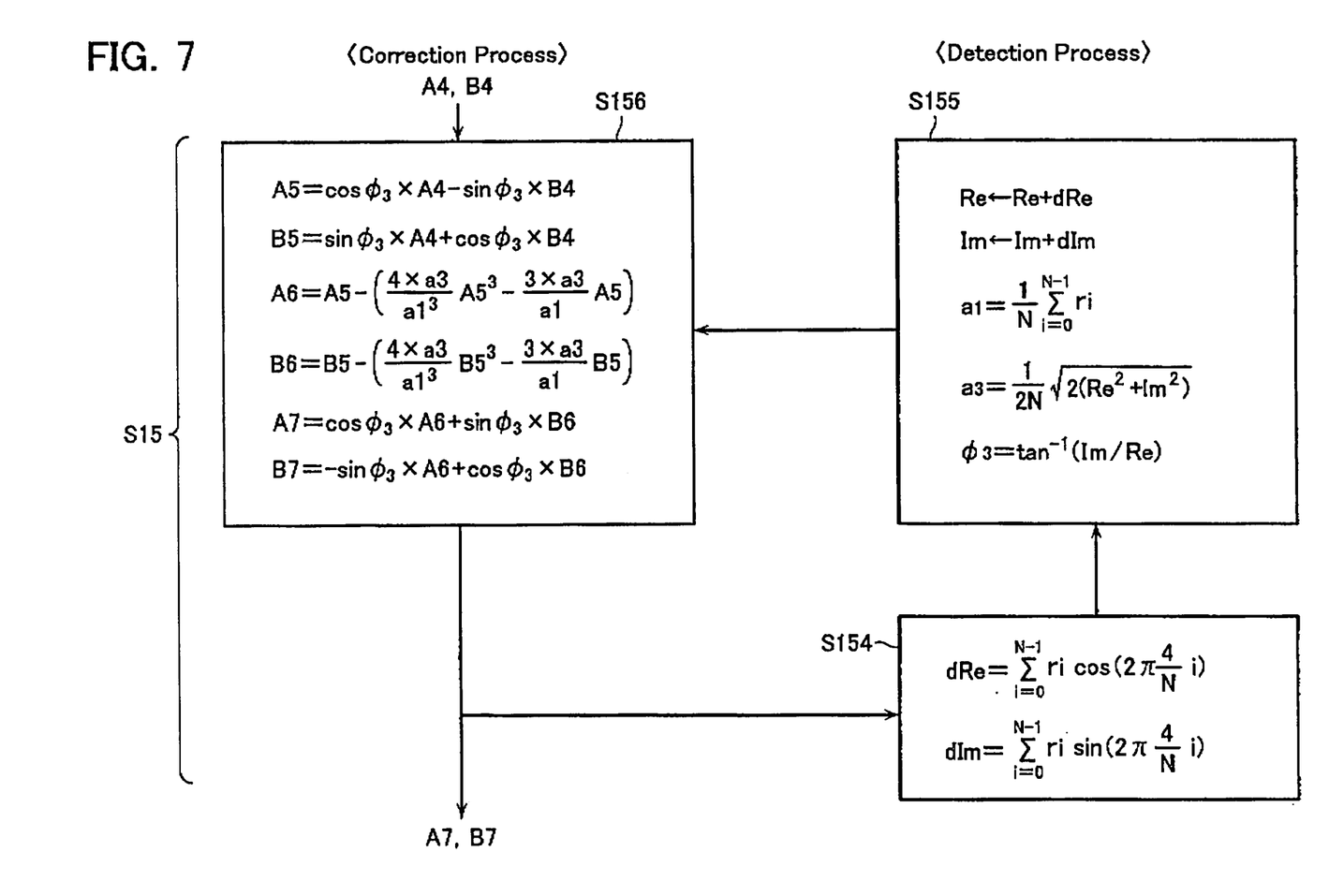
FIG. 7 is a flowchart showing details of third harmonic distortion correction of FIG. 2 (second method)

FIG. 7 shows a second method when $\phi_3$ is arbitrary. The method 1 is simple and sufficient to impose a light load on a computer. To the contrary, when $\phi_3$ is arbitrary, the smaller the amplitude a3 of the third harmonic component becomes, the lower the detection accuracy of the phase $\phi_3$ becomes possibly. The below-described method 2 is a method that can compute 03 more strictly. The method 2 is described below. This method 2 employs Fourier analysis to compute the amplitude a1, $a_3$ and the phase $\phi_3$. Namely, a signal component having a wavelength of $\lambda/4$ (a spatial frequency of $4 \cdot 2\pi/\lambda$) contained in a Lissajous waveform is Fourier-transformed into a real part Re and an imaginary part Im. For use in dynamic correction, from the real part and the imaginary part detected from the corrected waveform, dRe and dIm represented by [Expression 17] and [Expression 18] are derived (S154) to update Re and Im in accordance with a recurrence formula represented by [Expression 19] (S155). This update is repeated several times to converge Re, Im on certain values. Accordingly, these values are determined as Re, Im.

$$d\text{Re} = \sum_{i=0}^{N-1} r_i \cos\left(2\pi\frac{4}{N}i\right) \quad \text{[Expression 17]}$$

$$d\text{Im} = \sum_{i=0}^{N-1} r_i \sin\left(2\pi\frac{4}{N}i\right) \quad \text{[Expression 18]}$$

$$\text{Re} = \text{Re} + d\text{Re}$$
$$\text{Im} = \text{Im} + d\text{Im} \quad \text{[Expression 19]}$$

In accordance with [Expression 20] shown below, $a_1$ is obtained. In addition, based on Re and Im determined by the above [Expression 19], $a_3$ and $\phi_3$ are obtained in accordance with the following [Expression 21] and [Expression 22] as a distance from and an angle to the coordinate origin in a complex space specified by Re, Im. In [Expression 21], a multiplication coefficient $\sqrt{2}$ is employed because the magnitude of the signal obtained through Fourier transformation is an effective value and the amplitude is $\sqrt{2}$ times the value.

$$a_1 = \frac{1}{N}\sum_{i=0}^{N-1} r_i \quad \text{[Expression 20]}$$

$$a_3 = \frac{1}{2N}\sqrt{2(\text{Re}^2 + \text{Im}^2)} \quad \text{[Expression 21]}$$

$$\phi_3 = \tan^{-1}(\text{Im}/\text{Re}) \quad \text{[Expression 22]}$$

Figure 8:
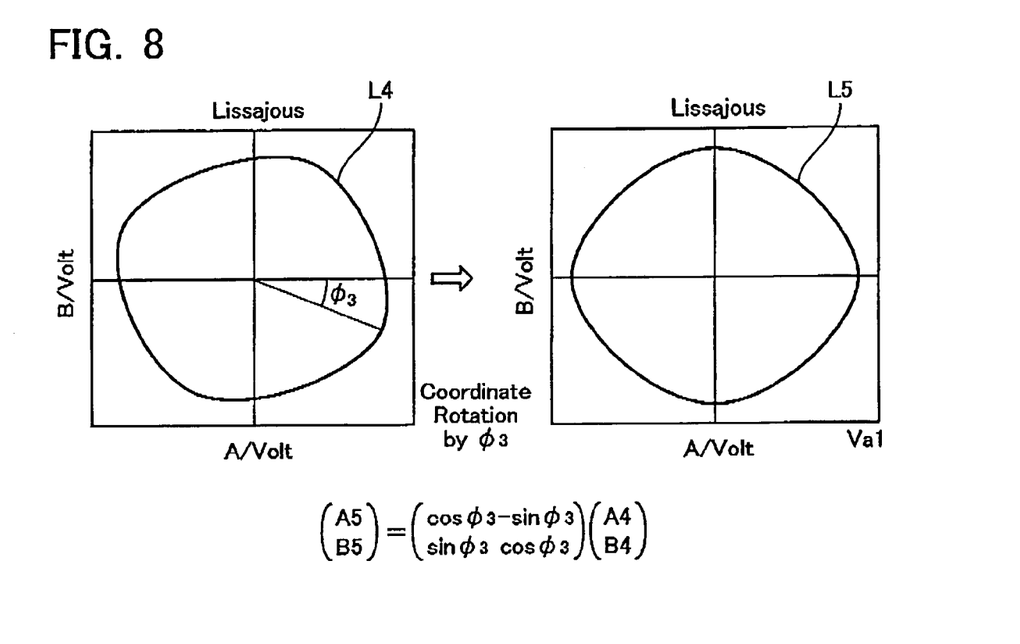
FIG. 8 illustrates coordinate rotation in a correction process of FIG. 7.

In the third harmonic distortion correction process, a computation shown in the following [Expression 23] is executed to rotate a Lissajous waveform L4 of the signals A4. B4 shown on the left side in FIG. 8 counterclockwise by an angle $\phi_3$ corresponding to a phase of the third harmonic. In this case, a Lissajous waveform L5 corresponding to the signals A5, B5 is created as shown on the right side in FIG. 8. The rotation of the angle $\phi_3$ is to make the third harmonic have a phase of 0° or 90° on the Lissajous waveform land execute the amplitude correction process in this state.

$$\begin{pmatrix} A5 \\ B5 \end{pmatrix} = \begin{pmatrix} \cos\phi_3 & -\sin\phi_3 \\ \sin\phi_3 & \cos\phi_3 \end{pmatrix}\begin{pmatrix} A4 \\ B4 \end{pmatrix} \quad \text{[Expression 23]}$$

Figure 9:
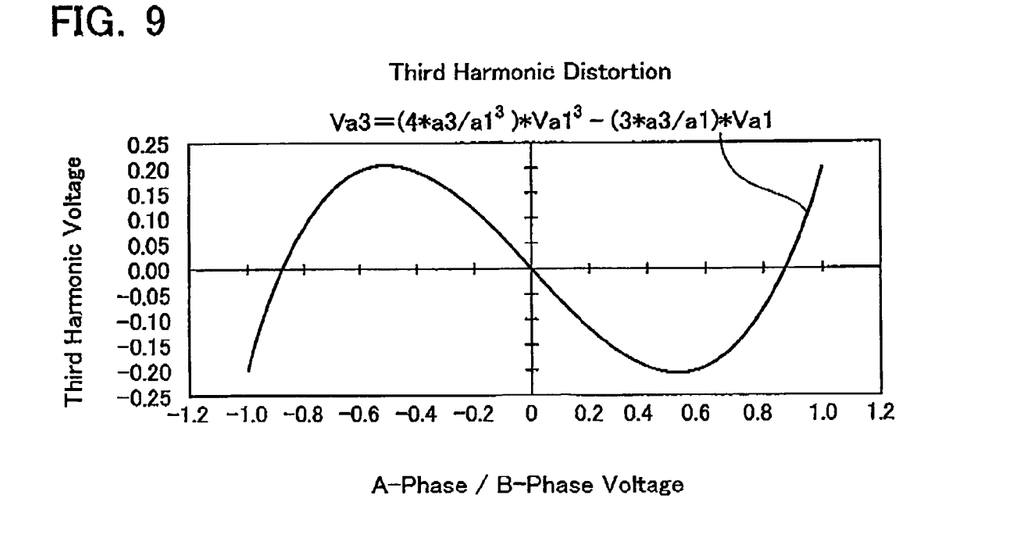
FIG. 9 is a graph showing a relation between voltages of A-phase (or B-phase) and third harmonic in the correction process of FIG. 7.

In this state, a correction is executed based on a curve of A-phase (or B-phase) voltage related to the third harmonic voltage in FIG. 9, using the fundamental harmonic amplitude $a_1$ and the third harmonic amplitude $a_3$. This correction is to remove the third harmonic component from the output signals A5, B5 having the third harmonic with a phase of 0° or 90° in accordance with the following Expression.

$$A6 = A5 - \left(\frac{4a_3}{a_1^3}A5^3 - \frac{3a_3}{a_1}A5\right) \quad \text{[Expression 24]}$$

$$B6 = B5 - \left(\frac{4a_3}{a_1^3}B5^3 - \frac{3a_3}{a_1}B5\right)$$

Finally, the following computation is executed to inversely rotate a Lissajous waveform of the signals A6, B6 (by an angle $-\phi_3$) to create the signals A7, B7 (S156). The Lissajous waveform rotated by the angle $-\phi_3$, or the output signals A7, B7, contain the same fundamental harmonic as those of the original output signals A4, B4, and the third harmonic component is subtracted therefrom.

$$\begin{pmatrix} A7 \\ B7 \end{pmatrix} = \begin{pmatrix} \cos(-\phi_3) & -\sin(-\phi_3) \\ \sin(-\phi_3) & \cos(-\phi_3) \end{pmatrix}\begin{pmatrix} A6 \\ B6 \end{pmatrix} \quad \text{[Expression 25]}$$

In this embodiment, for achievement of fast convergence, a recurrence formula of division is employed for ka1, kb1 and a recurrence formula of multiplication for kp1 though a method of addition/subtraction is also usable.

It is required to execute the above correction processes after the Lissajous rotates at least one turn or more. When removal of noises from the signal is taken into account, it may be considered to obtain with an average of N turns. During a required number of turns, previously detected correction values da1, db1, . . . , Im are employed in a correction computation. Therefore, it starts from a state of initial values (all 0s with no correction). On detection of a required number of turns, the above-described da1, db1, . . . , Im are applied to the correction computation. With the correction values, the correction computation is continued up to a certain-number of turns. This corrected Lissajous signal has a value with a much smaller error. Accordingly, the value is employed as the starting point for the next correction detection. That is, Δda1, Δdb1, . . . , ΔIm are obtained and accumulated into da1, db1, Im. While the above procedure is repeated infinitely, the correction values da1, db1, . . . , Im approach respective real values and at last converge on a detection resolution.

With respect to the correction of the third harmonic distortion, two methods are exemplified while either method can be achieved by a recurrence formula of any one of addition, subtraction, multiplication and division. An optimal method may be selected in accordance with the computation speed and the convergence condition.

Figure 10:
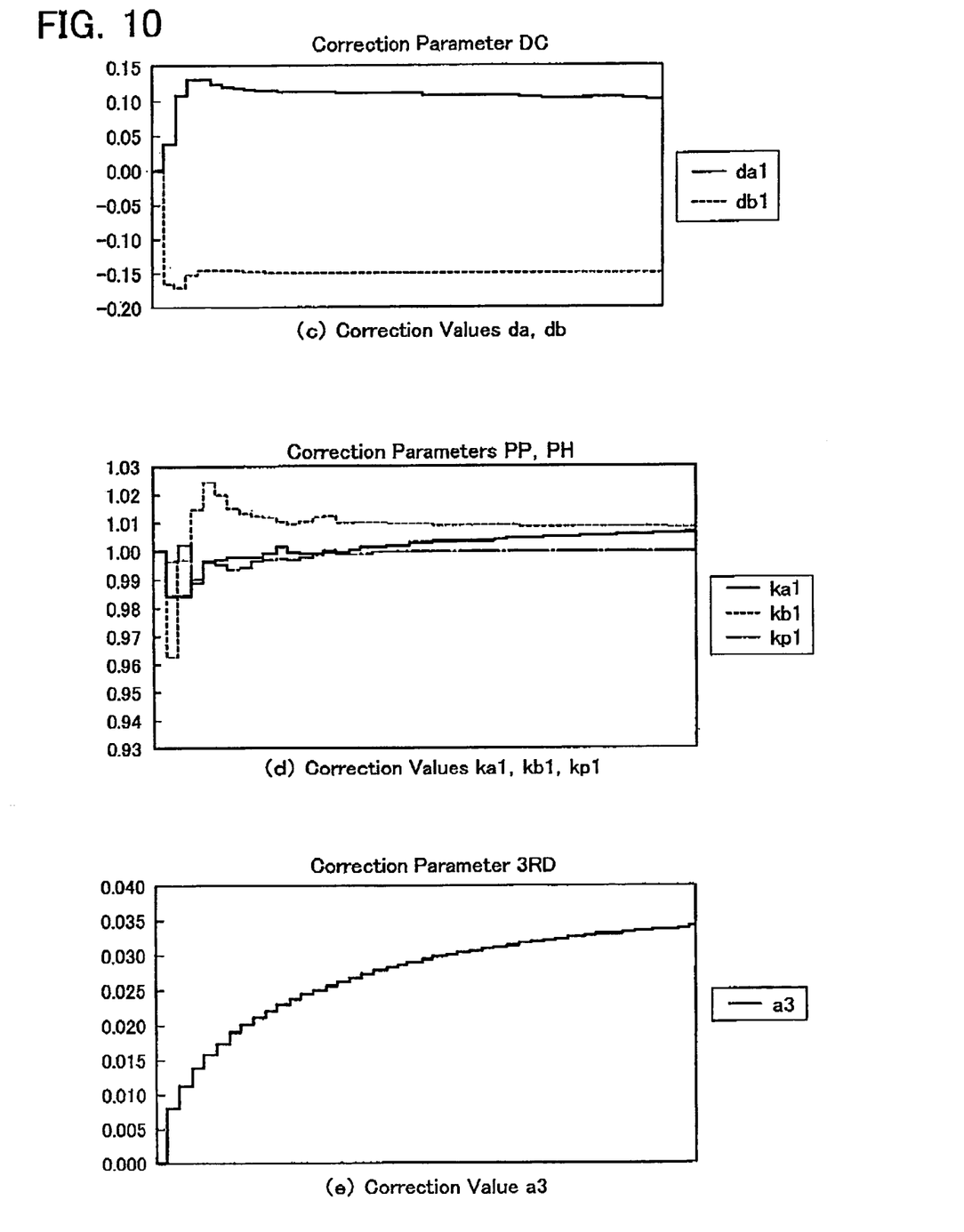
FIG. 10 shows graphs illustrative of correction values converging in dynamic correction.

FIG. 10 shows the states of detected correction values converging on constant values.

When the dynamic correction is halted after sufficient convergence in this way, the value may be stored in a non-volatile memory and can be utilized in an auto-calibration system of the static correction as well.

Figure 11:
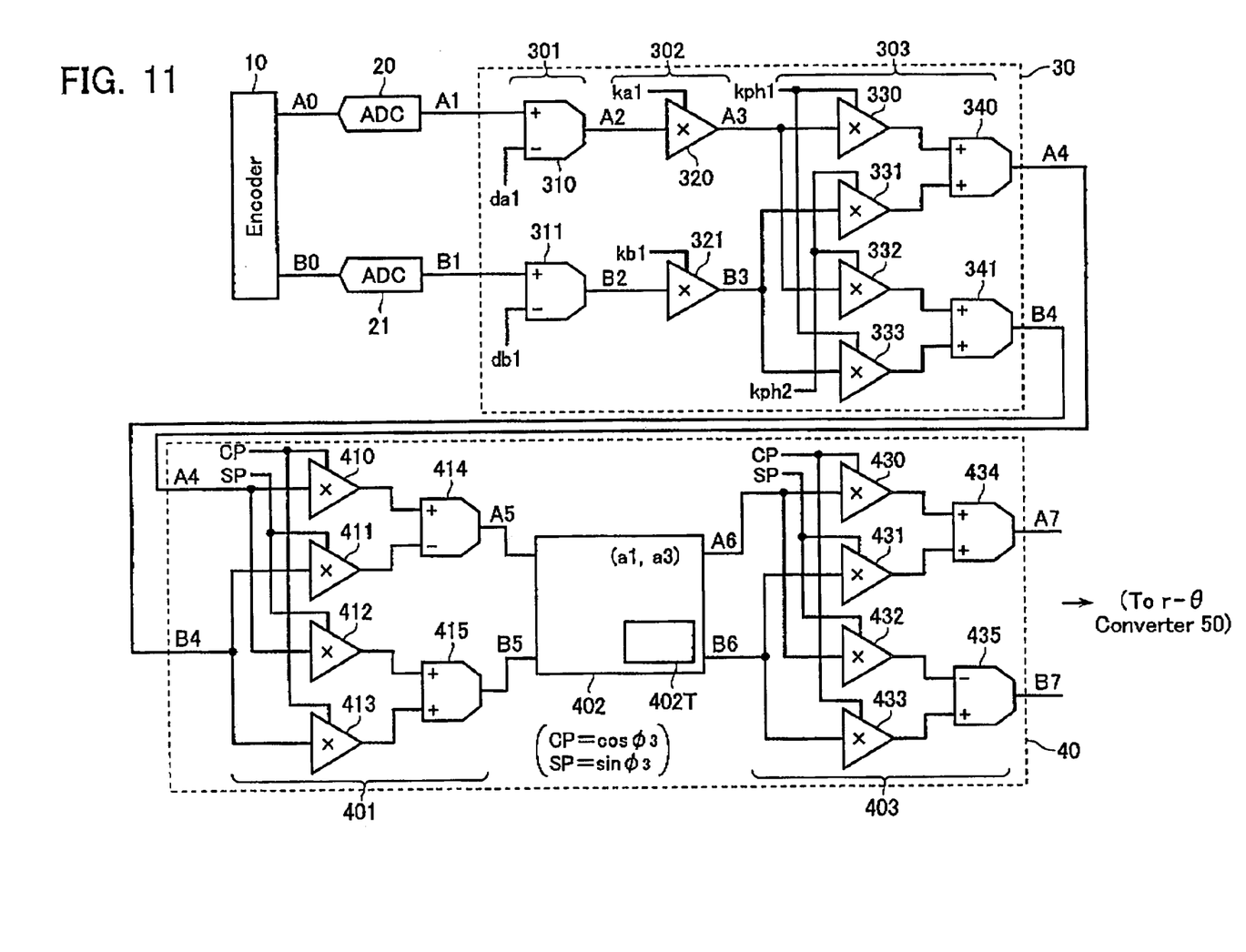
FIG. 11 is a circuit diagram showing specific circuitry of an offset/amplitude/phase corrector 30 and a third harmonic distortion corrector 40.

Specific circuitry of the offset/amplitude/phase corrector 30 and the third harmonic distortion corrector 40 are described with reference to FIG. 11.

The offset/amplitude/phase corrector 30 comprises an offset corrector 301, an amplitude corrector 302, and a phase corrector 303. The offset corrector 301 includes adders 310, 311 and executes the offset correction such that addition coefficients da1, db1 given from the offset/amplitude/phase detector 31 are added to the signals A1, B1, respectively. The amplitude corrector 302 includes multipliers 320, 321 and executes the amplitude correction such that the signals A2, B2 are multiplied by multiplication coefficients ka1, kb1 given from the offset/amplitude/phase detector 31, respectively. The phase corrector 303 includes multipliers 330-333 and adders 340, 341 and executes the phase correction such that multiplication coefficients kph1, kph2 given from the offset/amplitude/phase detector 31 are employed to convert the signals A3, B3 into the output signals A4, B4.

The third harmonic distortion corrector 40 comprises a coordinate rotator 401, an amplitude corrector 402, and a coordinate inverse rotator 403. The coordinate rotator 401 includes multipliers 410-413 and adders 414, 415. The coordinate rotator 401 is operative to rotate the Lissajous waveform L4 of the signals A4, B4 counterclockwise by the angle $\phi_3$ corresponding to the phase of the third harmonic to create the Lissajous waveform L5 corresponding to the signals A5, B5. The amplitude corrector 402 employs the fundamental harmonic amplitude $a_1$ and the third harmonic amplitude $a_3$ computed at the third harmonic computer/detector 41 for correction to remove the third harmonic component from the output signals A5, B5 having the third harmonic with a phase of 0° or 90°. This computation can be achieved by providing a look-up table 402T that stores a relation between A5 and A6 or a relation between B5 and B6 shown in Expression 24. Namely, each sampled value of the output signal A5 (or B5) is employed as an index to the look-up table 402T to read out the value of the third harmonic component to provide the output value A6, B6 as it is.

The coordinate inverse rotator 403 includes multipliers 430-433 and adders 434, 435 and rotates the Lissajous waveform of the signals A6, B6 clockwise by the angle $\phi_3$ rotated at the coordinate rotator 401 or inversely (by the angle $-\phi_3$) to create the signals A7, B7 through the following computations. The Lissajous waveform rotated by the angle $-\phi_3$, or the output signals A7, B7, contains the same fundamental harmonic as those of the original output signals A4, B4, and the third harmonic component is subtracted therefrom.

Thus, the third harmonic computer/detector 41 computes $a_1$, $a_3$, $\phi_3$, which are employed for correction in the third harmonic distortion corrector 40. The correction in the third harmonic distortion corrector 40, the r-θ conversion in the r-θ converter 50, and the computation of correction coefficients in the third harmonic computer/detector 41 are repeated several times to further remove the third harmonic components from the output signals A7, B7. As a result, the output signals A7, B7 can be approximated to ideal sinusoidal waveforms.

Figure 12:
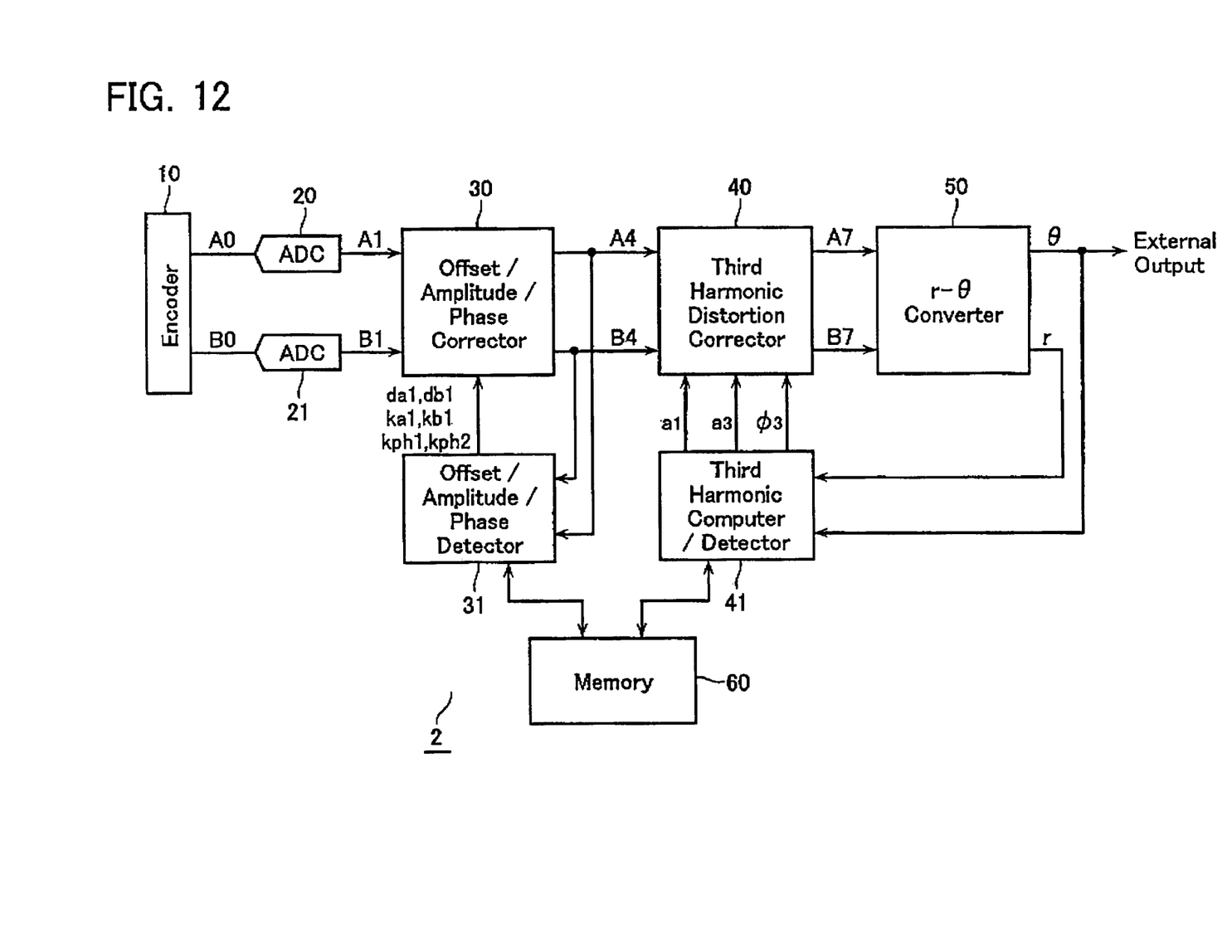
FIG. 12 is a block diagram showing a basic configuration of an encoder output signal correction device 2 according to another embodiment of the present invention.

FIG. 12 is a block diagram showing a basic configuration of an encoder output signal correction device 2 according to another embodiment of the present invention. This embodiment comprises a memory 60 provided to store correction coefficients dynamically corrected at the offset/amplitude/phase detector 31 and the third harmonic computer/detector 41. A correction coefficient may be stored in the memory 60 at some timing, for example, (1) when an external switch is pressed, (2) when power is turned off (terminated) and (3) always (in accordance with an operation clock or when each correction coefficient is updated in the corrector 30, 40). At the time of restart, the correction coefficients may be readout of the memory 60 and stored as initial values in the detectors 31, 41. Subsequent processes are similar to those of the above-described dynamic correction. A dynamic correction invalidating instructor means operative to invalidate the operation of dynamically updating the correction coefficient may be provided. When the dynamic correction invalidating instructor means instructs invalidation of dynamical correction, the corrector 30, 40 may employ the correction coefficient read out of the memory 60 to correct the two-phase sinusoidal signals.

The embodiments of the invention have been described above though the present invention is not limited to these embodiments but rather can be devised to provide various modification and additions without departing from the scope and spirit of the invention. For example, in the above embodiments the A- and B-phase sinusoidal signals output from the encoder are subjected first to the offset, amplitude and phase corrections, then to the third harmonic correction though this order can be switched. Namely, the third harmonic correction may be executed first, then the offset, amplitude and phase corrections. In the above embodiments the amplitude and phase corrections are executed in digital circuits though the same processes may be performed using a DSP or software.

What is claimed is:

1. An encoder output signal correction apparatus for correcting two-phase sinusoidal signals with a phase difference output from an encoder, comprising:

a detector means operative to detect an error from an ideal Lissajous waveform contained in a Lissajous waveform obtained from said two-phase sinusoidal signals; and a corrector means operative to correct said two-phase sinusoidal signals using a correction coefficient based on said error detected at said detector means, wherein said detector means detects an error from said ideal Lissajous waveform contained in said two-phase sinusoidal signals corrected at said corrector means, and accumulatively computes said detected error to yield a new correction coefficient, thereby dynamically updating said correction coefficient.

2. The encoder output signal correction apparatus according to claim 1, wherein said detector means is capable of detecting at least one of an offset error, an amplitude error, a phase error and a third harmonic distortion contained in said Lissajous waveform obtained from said two-phase sinusoidal signals.

3. The encoder output signal correction apparatus according to claim 1, wherein said detector means is capable of detecting an offset error contained in said Lissajous waveform obtained from said two-phase sinusoidal signals.

4. The encoder output signal correction apparatus according to claim 3, wherein from four zero-cross points (P12, P23, P34, P41) crossing X-axis and Y-axis on said Lissajous waveform obtained from said two-phase sinusoidal signals, said detector means derives variations ($\Delta da1$, $\Delta db1$) in offset correction values in X-axis and Y-axis directions and accumulatively computes said variations to detect said offset error.

5. The encoder output signal correction apparatus according to claim 1, wherein said detector means is capable of detecting an amplitude error contained in said Lissajous waveform obtained from said two-phase sinusoidal signals.

6. The encoder output signal correction apparatus according to claim 5, wherein from four zero-cross points (P12, P23, P34, P41) crossing X-axis and Y-axis on said Lissajous waveform obtained from said two-phase sinusoidal signals, said detector-means derives variations ($\Delta ka1$, $\Delta kb1$) in amplitude correction values in X-axis and Y-axis directions and accumulatively computes said variations to detect said amplitude error.

7. The encoder output signal correction apparatus according to claim 1, wherein said detector means is capable of detecting a phase error contained in said Lissajous waveform obtained from said two-phase sinusoidal signals.

8. The encoder output signal correction apparatus according to claim 7, wherein from four points (P1, P2, P3, P4) crossing straight lines (y=x, y=-x) tilted at 45° to X-axis and Y-axis on said Lissajous waveform obtained from said two-phase sinusoidal signals, said detector means derives a variation ($\Delta kp1$) in phase correction value for two-phase sinusoidal signals and accumulatively computes said variation to detect said phase error.

9. The encoder output signal correction apparatus according to claim 1, wherein said detector means is capable of detecting a third harmonic distortion contained in said Lissajous waveform obtained from said two-phase sinusoidal signals.

10. The encoder output signal correction apparatus according to claim 9, wherein a fundamental harmonic in said two-phase sinusoidal signals has an amplitude of a1, said third harmonic has an amplitude of a3, and said third harmonic has a phase of $\phi 3=0$, wherein from four points (P1, P2, P3, P4) crossing straight lines (y=x, y=-x) tilted at 45° to X-axis and Y-axis on said Lissajous waveform obtained from said two-phase sinusoidal signals, and four zero-cross points (P12, P23, P34, P41) crossing X-axis and Y-axis, said detector means derives the maximum ($r_{max}$) and the minimum ($r_{min}$) of a radius of said Lissajous waveform, and accumulatively computes a variation ($\Delta a1$) in fundamental harmonic in two-phase sinusoidal signals and a variation ($\Delta a3$) in third harmonic correction value, wherein said two-phase sinusoidal signals have a value of Va1 at each point in time, and said third harmonic component has a value of Va3 at each point in time, and wherein said detector means derives Va3 from:

$$Va3 = K1 \cdot Va1^3 - K2 \cdot Va1$$

(where K1, K2 are coefficients determinable from a1, a3) to detect said third harmonic component.

11. The encoder output signal correction apparatus according to claim 9, wherein a fundamental harmonic in said two-phase sinusoidal signals has an amplitude of a1, said third harmonic has an amplitude of a3, and said third harmonic has a phase of $\phi 3=0$, wherein said detector means derives said amplitudes a1, a3, $\phi 3$ through Fourier transformations of signal components having a wavelength of $\lambda/4$ (a spatial frequency of $4 \cdot 2\pi/\lambda$) contained in said Lissajous waveform obtained from said two-phase sinusoidal signals, wherein said corrector means rotates said Lissajous waveform by $\phi 3$, wherein said two-phase sinusoidal signals have a value of Va1 at each point in time, and said third harmonic component has a value of Va3 at each point in time, wherein said corrector means derives Va3 from:

$$Va3 = K1 \cdot Va1^3 - K2 \cdot Va1$$

(where K1, K2 are coefficients determinable from a1, a3) to correct said third harmonic component, and wherein said corrector means inversely rotates said corrected Lissajous waveform by $\phi 3$.

12. The encoder output signal correction apparatus according to claim 2, wherein said detector computes the maximum and the minimum of a radius of said Lissajous waveform and, based on a difference between said maximum and said minimum, computes an amplitude of said third harmonic component as said third harmonic distortion.

13. The encoder output signal correction apparatus according to claim 2, wherein said detector derives a variation in radius of said Lissajous waveform through a Fourier analysis to compute an amplitude and phase of said third harmonic component as said third harmonic distortion.

14. The encoder output signal correction apparatus according to claim 2, wherein said corrector rotates said Lissajous waveform obtained from said two-phase sinusoidal signals containing a third harmonic component by a phase computed at said detector such that said third harmonic component has a phase of 0° or 90°; derives a value of said third harmonic component corresponding to each value of said two-phase sinusoidal signals; subtracts said value of said third harmonic component from two-phase sinusoidal signals corresponding to said rotated Lissajous waveform to correct amplitude; and inversely rotates a Lissajous waveform obtained from said corrected two-phase sinusoidal signals by the same angle as said rotated angle.

15. The encoder output signal correction apparatus according to claim 1, further comprising a memory operative to store said correction coefficient, wherein said detector means on activation reads out said correction coefficient stored in said memory for use as an initial value in said operation of dynamically updating.

16. The encoder output signal correction apparatus according to claim 1, further comprising:
   a memory operative to store said correction coefficient; and
   a dynamic correction invalidating instructor means operative to invalidate said operation of dynamically updating said correction coefficient,
   wherein, when said dynamic correction invalidating instructor means instructs invalidation of dynamical correction, said corrector means uses said correction coefficient read out of said memory to correct said two-phase sinusoidal signals.

17. An encoder output signal correction method, comprising:
   detecting and correcting an offset error contained in two-phase sinusoidal signals with a phase difference output from an encoder;
   detecting and correcting an amplitude error contained in said offset-corrected two-phase sinusoidal signals;
   detecting and correcting a phase error contained in said amplitude-corrected two-phase sinusoidal signals; and
   detecting and correcting a third harmonic distortion contained in said phase-corrected two-phase sinusoidal signals,
   wherein each correction step includes detecting an error from an ideal Lissajous waveform contained in said corrected two-phase sinusoidal signals, and adding said detected error to an accumulatively added last value to yield a new correction coefficient, thereby dynamically updating said correction coefficient.

18. The encoder output signal correction method according to claim 17, wherein said detecting and correcting a third harmonic distortion is performed by computing the maximum and the minimum of a radius of said Lissajous waveform and, based on a difference between said maximum and said minimum, computing an amplitude of said third harmonic component as said third harmonic distortion.

19. The encoder output signal correction method according to claim 2, wherein said detecting and correcting a third harmonic distortion is performed by deriving a variation in radius of said Lissajous waveform through a Fourier analysis to compute an amplitude and phase of said third harmonic component as said third harmonic distortion.

* * * * *